July 25, 1939. G. C. MORUE 2,167,584
TUBING RACK
Filed July 12, 1938 3 Sheets-Sheet 1
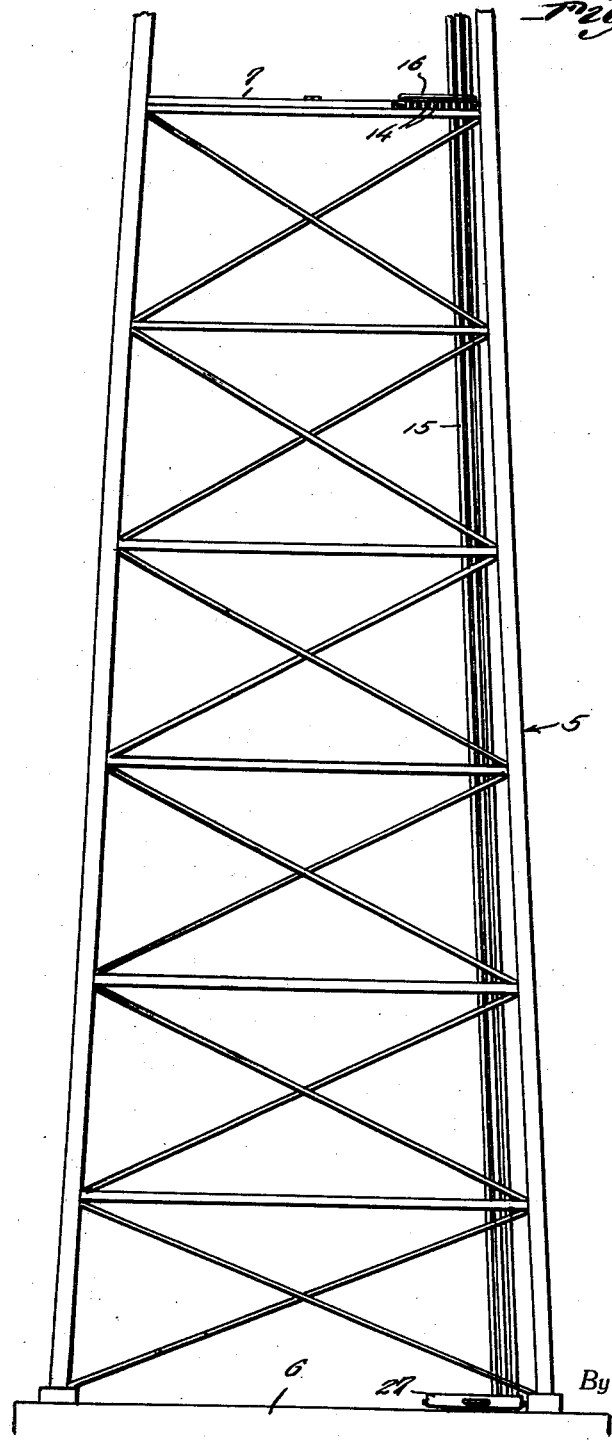
Fig. 1.
Fig. 5.
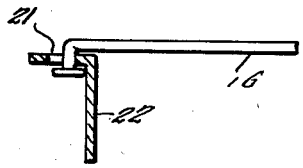
Fig. 6.
Fig. 7.
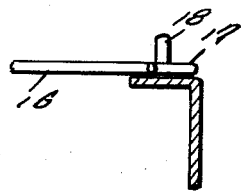
Fig. 8.
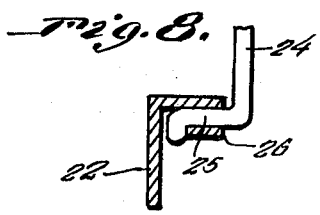
Inventor
G. C. Morue
By Clarence A. O'Brien
and Hyman Berman
Attorneys July 25, 1939.  G. C. MORUE  2,167,584
TUBING RACK
Filed July 12, 1938  3 Sheets-Sheet 2
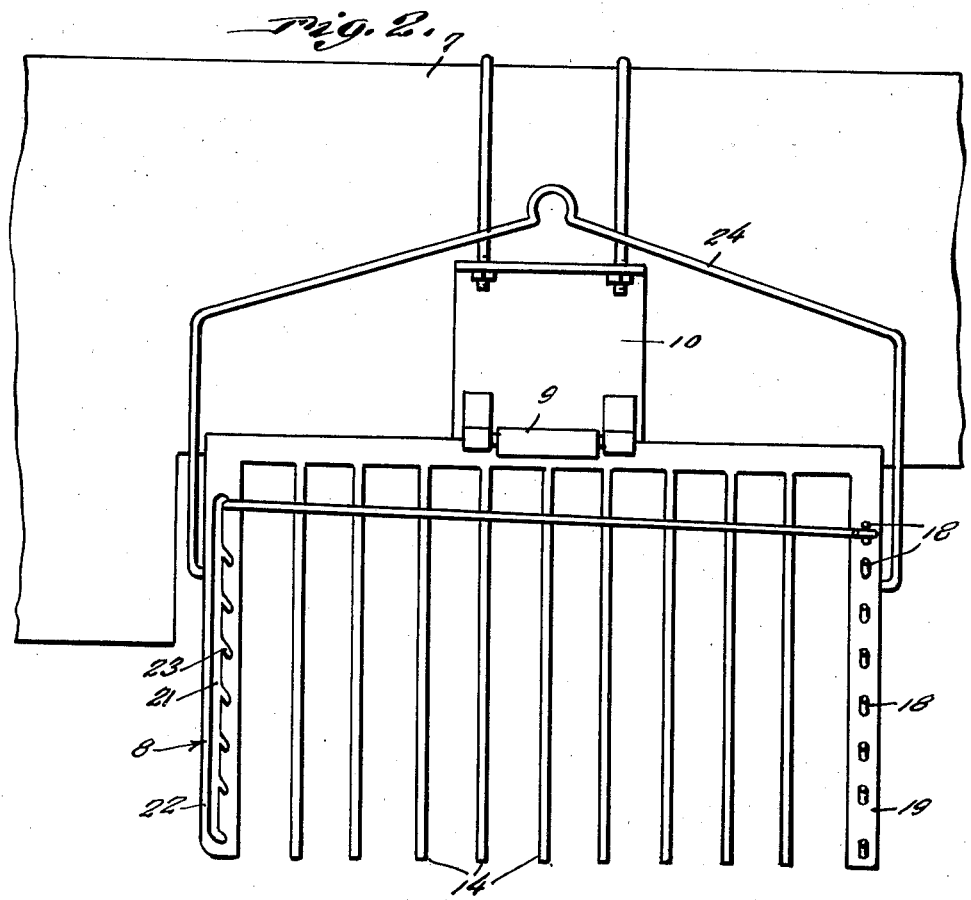
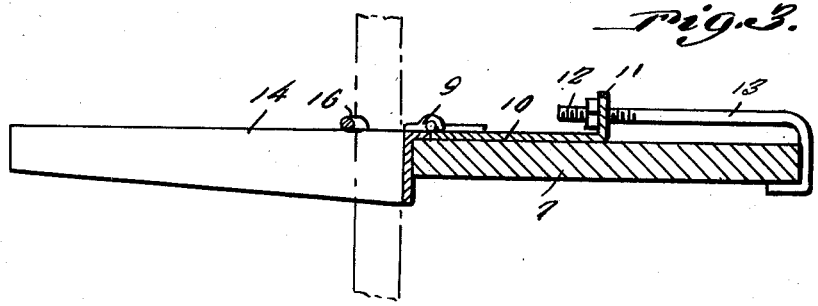
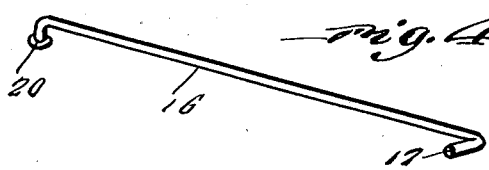
Inventor
G. C. Morue
By Clarence A. O'Brien
and Hyman Berman
Attorneys July 25, 1939.  G. C. MORUE  2,167,584
TUBING RACK
Filed July 12, 1938   3 Sheets-Sheet 3

Inventor
G. C. Morue
By Clarence A. O'Brien
and Hyman Berman
Attorneys

Patented July 25, 1939

2,167,584

UNITED STATES PATENT OFFICE 2,167,584

TUBING RACK

George C. Morue, Maud, Okla.

Application July 12, 1938, Serial No. 218,861

6 Claims. (Cl. 211—60)

This invention relates to derrick tubing racks and has for its object the provision of a rack for use on derricks for supporting tubing or drill pipes.

In accordance with the present invention there is provided a tubing rack which may be readily mounted on the tubing board provided adjacent the upper end of a derrick and a pan for disposition on the floor of the derrick to accommodate the lower ends of the racked tubing and to receive the oil or other drippings from the derrick tubing when the latter is so racked.

The invention together with its objects and advantages will be best understood from a study of the following description taken in connection with the accompanying drawings wherein—

Figure 1 is a fragmentary elevational view of a derrick illustrating the application of the invention thereto.

Figure 2 is a top plan view showing a portion of the tubing board and a rack embodying the features of the present invention associated therewith.

Figure 3 is a transverse sectional view through the rack and tubing board.

Figure 4 is a perspective view of a retaining rod.

Figure 5 is a fragmentary detail view illustrating the manner of engaging one end of the retaining rod with a slotted end member of the rack.

Figure 6 is a view similar to Figure 5 and illustrating the manner of detachably connecting the hook-end of the retaining rod with a stud on an end member of the rack.

Figure 7 is a fragmentary elevational view taken substantially at right angles to Figure 6.

Figure 8 is a fragmentary detail sectional view showing the manner of pivotally mounting one end of a rod hanger with the rack.

Figure 9:
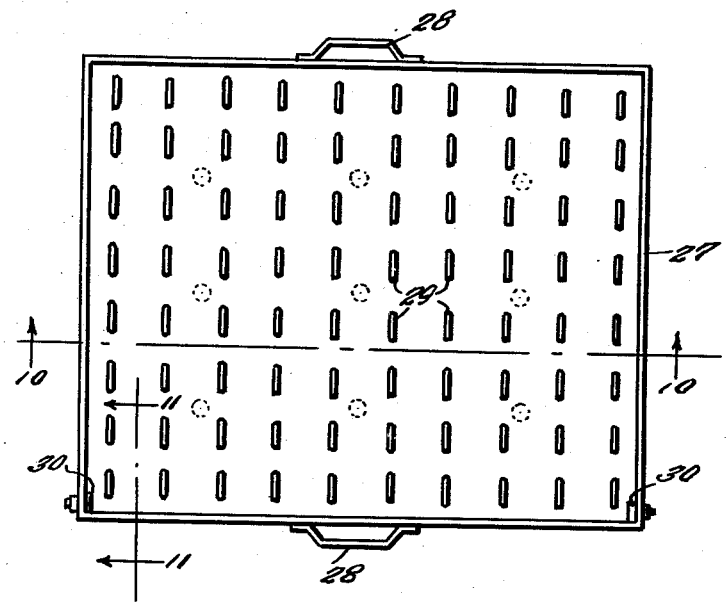
Figure 9 is a plan view of a pan embodying the features of the present invention.
Figure 10:
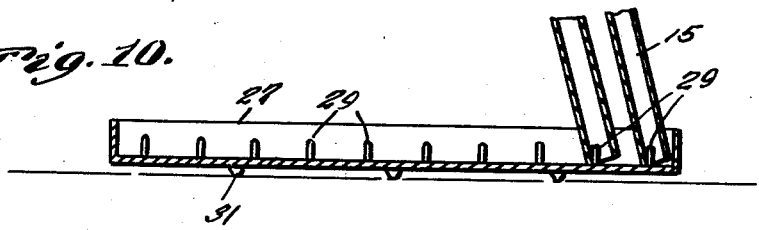
Figure 11:
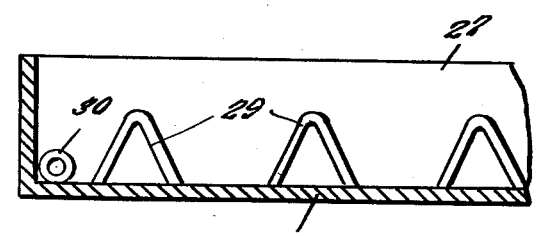

Figures 10 and 11 are sectional views taken substantially on lines 10—10 and 11—11 respectively of Figure 9.

Referring to the drawings by reference numerals it will be seen that the derrick as a whole is designated generally by the reference numeral 5, while the floor of the derrick is indicated by the reference numeral 6 and the tubing board mounted in an upper portion of the derrick is indicated by the reference numeral 7.

In accordance with the present invention there is provided a rack 8 that is in the form of a substantially U-shaped frame which at the closed end of the U is hinged as at 9 to a plate 10 that rests on the top side of the tubing board 7. At the end thereof farthest remote from the hinge 9, plate 10 is provided with an upstanding flange 11 which receives the threaded and nut-equipped ends 12 of fastening hooks 13. Hooks 13 engage over the outer edge of the tubing board 7 as shown in Figure 3 and thus serve to positively and efficiently secure the rack 8 to the board 7 in a manner which will permit the rack to be either disposed at the operative position shown or folded back into a position substantially overlapping or overlying the board 7, which would be the position of the rack when not in use. It will be further appreciated that the rack may be in this manner quickly and efficiently secured to the tubing board 7.

The frame of the rack 8 is preferably formed of angle iron and extending in parallelism with the end members of the frame are laterally spaced fingers 14 between which are placed the upper ends of the well tubing 15 in an obvious manner.

To retain the upper ends of the tubing 15 in the spaces between the fingers 14 there is provided a retaining bar 16.

The bar 16 bridges the spaces between the fingers 14 and at one end is provided with a hook 17 adapted to engage over a selected one of a series of relatively spaced inclined studs 18 provided on the end member 19 of the rack frame. At the opposite end thereof the retaining bar 16 is provided with a down-turned headed portion 20 that is engageable in a longitudinal slot 21 provided therefor in the end member 22 of the rack frame. Opening into the slot 21 are diagonal slots 23 with a selected one of which the headed end 20 is engaged for holding the bar 16 in operative position on the rack frame. Also in accordance with the present invention the rack 8 has pivoted thereto a handling bail 24 that is to be used in an obvious manner for hoisting or lifting the rack from the tubing board 7 or for transferring the rack from the tubing floor 7 of one derrick to the tubing floor 7 of another; the hanger bar 24 being in the form of a bail, the legs of which at the terminals thereof are formed to provide headed pintles 25 journalled in suitable bearings 26 provided therefor in the end members 19 and 22 of the frame of the rack.

Also, in accordance with the present invention there is provided for disposition on the floor 6 of the derrick and beneath the rack 8 a pan 27 adapted to accommodate the lower ends of the racked tubings 15 as shown in Figure 10. To facilitate handling thereof the pan 27 is provided at opposite sides thereof with handles 28.

Also the pan 27 is provided with longitudinal and transverse rows of retaining lugs 29 that extend upwardly from the bottom of the pan and are of suitable construction and shape to fit in the lower ends of the tubings 15 as shown in Figure 10 and preventing said ends of the tubing from shifting or creeping while resting within the pan.

Also, and as shown the pan 27 at each two or more corners thereof is provided with suitable drains 30 through which oil or the like draining from the tubes 15 into the pan may in turn drain from the pan.

Also, the pan is provided on the opposite side thereof with teats, or other suitable supports 31 that serve to support the pan raised above the level of the derrick floor.

It is thought that a clear understanding of the construction, utility, and advantages of an invention embodying the features of the present invention will be had without a more detailed description.

Having thus described the invention what is claimed as new is:

1. A tubing rack for derricks comprising a frame and laterally spaced parallel fingers mounted in the frame for receiving tubing therebetween, said frame embodying a pair of opposed end members one of which has a series of studs projecting upwardly therefrom and the other of which is provided with a longitudinal slot and a series of spaced slots opening into the longitudinal slot, and a retaining bar having a hook-equipped end adapted to engage a selected one of said studs and an angularly headed end engaging in said longitudinal slot and adapted to be engaged with a selected one of the slots of said series of slots.

2. A tubing rack for derricks comprising a frame and laterally spaced parallel fingers mounted in the frame for receiving tubing therebetween, said frame embodying a pair of opposed end members one of which has a series of studs projecting upwardly therefrom and the other of which is provided with a longitudinal slot and a series of spaced slots opening into the longitudinal slot, and a retaining bar having a hook-equipped end adapted to engage a selected one of said studs and an angularly headed end engaging in said longitudinal slot and adapted to be engaged with a selected one of the slots of said series of slots, and a pan for disposition beneath said rack for receiving the lower ends of racked tubing, said pan being provided with longitudinal and transverse rows of upstanding projections adapted to be received within the lower ends of the racked tubing for holding said ends of the tubing against creeping within the pan.

3. A tubing rack for derricks comprising a frame and laterally spaced parallel fingers mounted in the frame for receiving tubing therebetween, said frame embodying a pair of opposed end members one of which has a series of studs projecting upwardly therefrom and the other of which is provided with a longitudinal slot and a series of spaced slots opening into the longitudinal slot, and a retaining bar having a hook-equipped end adapted to engage a selected one of said studs and an angularly headed end engaging in said longitudinal slot and adapted to be engaged with a selected one of the slots of said series of slots, and a pan for disposition beneath said rack for receiving the lower ends of racked tubing, said pan being provided with longitudinal and transverse rows of upstanding projections adapted to be received within the lower ends of the racked tubing for holding said ends of the tubing against creeping within the pan, and said pan having drain means associated therewith.

4. In combination with the tubing board of a derrick, a tube rack, an attaching plate hinged to the tube rack, said attaching plate adapted to rest on said tubing board and provided with an upstanding apertured flange, and anchoring hooks for said attaching plate adapted to engage over one edge of the tubing board and having nut-equipped threaded ends engaged with the flange of said attaching plate.

5. In combination with the tubing board of a derrick, a tube rack, an attaching plate hinged to the tube rack, said attaching plate adapted to rest on said tubing board and provided with an upstanding apertured flange, an anchoring hook for said attaching plate adapted to engage over one edge of the tubing board and having nut-equipped threaded ends engaged with the flange of said attaching plate, and a handling member in the form of a bail pivoted to said rack.

6. A well tubing rack comprising a substantially U-shaped frame having a plurality of laterally spaced parallel fingers extending from the closed end of the U and arranged in parallelism with the opposite end portions of the U-shaped frame, an attaching plate for the frame hinged to the frame at the closed end of the U, and said attaching plate provided with means for detachably connecting the plate to the tubing board of a well derrick.

GEORGE C. MORUE.